United States Patent
Cosserat et al.

(10) Patent No.: US 11,563,594 B2
(45) Date of Patent: Jan. 24, 2023

(54) METHOD FOR CONTROLLING A HOME-AUTOMATION FACILITY

(71) Applicant: SOMFY SAS, Cluses (FR)

(72) Inventors: Hubert Cosserat, Annemasse (FR); Florent Michel, Chomerac (FR)

(73) Assignee: SOMFY SAS, Cluses (FR)

( * ) Notice: Subject to any disclaimer, the term of this patent is extended or adjusted under 35 U.S.C. 154(b) by 10 days.

(21) Appl. No.: 15/740,694

(22) PCT Filed: Jun. 30, 2016

(86) PCT No.: PCT/FR2016/051632
§ 371 (c)(1),
(2) Date: May 29, 2018

(87) PCT Pub. No.: WO2017/006019
PCT Pub. Date: Jan. 12, 2017

(65) Prior Publication Data
US 2018/0270075 A1    Sep. 20, 2018

(30) Foreign Application Priority Data
Jul. 3, 2015  (FR) ...................... 15/56296

(51) Int. Cl.
*H04L 69/14* (2022.01)
*H04L 12/28* (2006.01)
(Continued)

(52) U.S. Cl.
CPC ...... *H04L 12/2807* (2013.01); *H04L 12/6418* (2013.01); *H04L 41/12* (2013.01); *H04L 69/14* (2013.01); *Y02D 30/50* (2020.08)

(58) Field of Classification Search
CPC ........ H04W 84/18; H04L 41/04; H04L 45/04; H04L 45/00; H04L 45/02; H04L 41/02
See application file for complete search history.

(56) References Cited

U.S. PATENT DOCUMENTS 5,500,934 A * 3/1996 Austin ............... G06F 3/0481
                                                    715/835
8,374,104 B2   2/2013 Gauweiler et al.
(Continued)

OTHER PUBLICATIONS

International Search Report and Written Opinion for International Application No. PCT/FR2016/051632 dated Sep. 28, 2016 (2 pgs).
(Continued)

*Primary Examiner* — Hassan A Phillips
*Assistant Examiner* — Prenell P Jones
(74) *Attorney, Agent, or Firm* — Cantor Colburn LLP (57) ABSTRACT

The present invention concerns a method for controlling a home-automation facility comprising at least one central control unit (U1, U2) belonging to a home-automation facility; the method being executed by a user terminal (T) and comprising the following steps: selecting (ECTLT1) a first local connection mode (CM1) or a second wide area network connection mode; establishing (ECTLT2) a connection between the user terminal and at least one target unit (U1, U2, Sv), said at least one target unit (U1, U2, Sv) being a central control unit (U1, U2) in the case in which the first local connection mode (CM1) has been selected, and a management unit (Sv) in the case in which the second wide area network connection mode has been selected; sending (ECTLT3) a discovery message (MCTLD1, MCTLD2, MCTLD') linked with a facility identifier (StID) to at least one target unit (U1, U2, Sv); receiving (ECTLT5, ECTLT7) at least one topology description message originating from the target unit (U1, U2, Sv) comprising a description of a group of devices (DGrSt) attached to the facility identifier (StID).

21 Claims, 5 Drawing Sheets

(51) Int. Cl.
    *H04L 12/64*                (2006.01)
    *H04L 41/12*                (2022.01)

(56) References Cited

U.S. PATENT DOCUMENTS

| | | | | |
|---|---|---|---|---|
| 8,548,607 | B1 | 10/2013 | Belz et al. | |
| 8,825,832 | B2* | 9/2014 | Whipple | H04L 69/40 709/224 |
| 9,202,365 | B2* | 12/2015 | Duchene | G08C 17/02 |
| 9,661,674 | B2* | 5/2017 | Su | H04W 52/0209 |
| 9,898,175 | B2* | 2/2018 | Fiedler | G06F 3/0482 |
| 2001/0040895 | A1* | 11/2001 | Templin | H04L 61/00 370/466 |
| 2002/0012320 | A1* | 1/2002 | Ogier | H04L 1/1614 709/239 |
| 2002/0013150 | A1 | 1/2002 | McKenna et al. | |
| 2002/0198951 | A1* | 12/2002 | Thurlow | G06Q 10/107 709/206 |
| 2005/0005242 | A1* | 1/2005 | Hoyle | G06F 9/00 715/745 |
| 2005/0021852 | A1 | 1/2005 | Accarie et al. | |
| 2005/0044225 | A1 | 2/2005 | Ota et al. | |
| 2005/0055108 | A1 | 3/2005 | Gonzales et al. | |
| 2005/0130611 | A1* | 6/2005 | Lu | H04W 88/06 455/130 |
| 2005/0198261 | A1 | 9/2005 | Durvasula et al. | |
| 2005/0258976 | A1 | 11/2005 | Zteng | |
| 2006/0133392 | A1 | 6/2006 | Ajitomi et al. | |
| 2006/0250578 | A1 | 11/2006 | Pohl et al. | |
| 2007/0104164 | A1 | 5/2007 | Laroia et al. | |
| 2007/0140168 | A1 | 6/2007 | Laroia et al. | |
| 2007/0158335 | A1* | 7/2007 | Mansbery | F24C 7/082 219/505 |
| 2007/0208782 | A1 | 9/2007 | Carter et al. | |
| 2007/0258718 | A1* | 11/2007 | Furlong | G08C 17/02 398/106 |
| 2008/0113665 | A1* | 5/2008 | Paas | H04M 1/72522 455/426.1 |
| 2008/0281971 | A1 | 11/2008 | Leppanen et al. | |
| 2009/0094317 | A1 | 4/2009 | Venkitaraman | |
| 2009/0117848 | A1 | 5/2009 | Nagata et al. | |
| 2009/0217335 | A1* | 8/2009 | Wong | H04N 21/4126 725/114 |
| 2009/0287529 | A1* | 11/2009 | Johnson | G06Q 40/02 705/39 |
| 2010/0146396 | A1* | 6/2010 | Able | G06F 16/95 715/735 |
| 2010/0332994 | A1* | 12/2010 | Istvan | H04N 21/4227 715/740 |
| 2011/0184561 | A1* | 7/2011 | Klasson | H04L 12/2807 700/275 |
| 2011/0280175 | A1* | 11/2011 | Yamada | H04W 84/105 370/315 |
| 2011/0302517 | A1* | 12/2011 | Duchene | G08C 17/02 715/771 |
| 2012/0002589 | A1 | 1/2012 | Saifullah et al. | |
| 2012/0088525 | A1 | 4/2012 | Kurokawa et al. | |
| 2012/0235579 | A1 | 9/2012 | Chemel et al. | |
| 2012/0296451 | A1 | 11/2012 | Kaps et al. | |
| 2012/0312874 | A1* | 12/2012 | Jonsson | H05B 47/175 235/385 |
| 2012/0331156 | A1* | 12/2012 | Colpitts | H04W 12/0804 709/227 |
| 2013/0053054 | A1* | 2/2013 | Lovitt | H04W 48/20 455/456.1 |
| 2013/0215116 | A1* | 8/2013 | Siddique | G06Q 20/204 345/420 |
| 2013/0286892 | A1 | 10/2013 | Fuste Vilella et al. | |
| 2013/0289752 | A1* | 10/2013 | Orsat | H04L 63/065 700/90 |
| 2013/0337769 | A1 | 12/2013 | Bhatia et al. | |
| 2014/0040435 | A1 | 2/2014 | Ylimartimo | |
| 2014/0064209 | A1* | 3/2014 | Anchan | H04W 76/25 370/329 |
| 2014/0153489 | A1* | 6/2014 | Perras | H04W 60/00 370/328 |
| 2014/0159879 | A1* | 6/2014 | Rezvani | G06F 21/31 340/12.22 |
| 2014/0172176 | A1* | 6/2014 | Deilmann | H04L 12/2827 700/275 |
| 2015/0012463 | A1* | 1/2015 | Rosenthal | G10L 25/63 706/11 |
| 2015/0012646 | A1 | 1/2015 | Yang et al. | |
| 2015/0048162 | A1* | 2/2015 | Jonsson | G06Q 10/087 235/385 |
| 2015/0156031 | A1 | 6/2015 | Fadell et al. | |
| 2015/0163119 | A1* | 6/2015 | Dupre | H04L 47/24 709/224 |
| 2015/0200787 | A1 | 7/2015 | Slupik et al. | |
| 2015/0208454 | A1 | 7/2015 | Cho et al. | |
| 2016/0021502 | A1* | 1/2016 | Kim | H04W 4/021 455/456.1 |
| 2016/0072781 | A1* | 3/2016 | Zhang | H04L 63/065 726/4 |
| 2016/0073274 | A1 | 3/2016 | Burley | |
| 2016/0080232 | A1* | 3/2016 | Dupre | H04L 47/24 709/224 |
| 2016/0081132 | A1* | 3/2016 | Lee | H04W 76/10 |
| 2016/0098309 | A1* | 4/2016 | Kim | G06F 11/0709 714/47.1 |
| 2016/0098468 | A1* | 4/2016 | Logue | G06F 16/258 707/756 |
| 2016/0099826 | A1* | 4/2016 | Logue | G06F 16/258 709/223 |
| 2016/0099830 | A1* | 4/2016 | Stellick | H04L 41/0663 370/228 |
| 2016/0099866 | A1* | 4/2016 | Stellick | H04L 45/22 370/225 |
| 2016/0100305 | A1* | 4/2016 | Karampatsis | H04L 63/08 370/328 |
| 2016/0112870 | A1* | 4/2016 | Path | H04W 12/04 726/4 |
| 2016/0150390 | A1* | 5/2016 | Chen | H04W 40/246 370/311 |
| 2016/0165663 | A1* | 6/2016 | Shanmugam | H04W 76/10 370/338 |
| 2016/0227471 | A1 | 8/2016 | De Foy et al. | |
| 2016/0262200 | A1* | 9/2016 | Su | H04W 8/183 |
| 2017/0079086 | A1* | 3/2017 | Kuge | H04W 76/14 |
| 2017/0332288 | A1* | 11/2017 | Sadek | H04L 1/1854 |
| 2018/0084488 | A1* | 3/2018 | Han | H04L 5/0048 |
| 2018/0091391 | A1* | 3/2018 | Turow | G06F 16/23 |
| 2018/0270075 | A1 | 9/2018 | Cosserat et al. | |
| 2018/0287813 | A1 | 10/2018 | Cosserat et al. | |
| 2018/0294989 | A1 | 10/2018 | Cosserat et al. | |
| 2018/0367943 | A1* | 12/2018 | Pipes | H04W 4/02 |
| 2020/0020353 | A1* | 1/2020 | Levy-Rosenthal | G10L 25/63 |

OTHER PUBLICATIONS

International Search Report for International Application No. PCT/FR2016/051634 dated Oct. 31, 2016.
Translation of International Search Report for International Application No. PCT/FR2016/051634 dated Oct. 31, 2016.
Written Opinion for International Application No. PCT/FR2016/051634 dated Oct. 31, 2016.
U.S. Office Action for U.S. Appl. No. 15/740,699; dated Jun. 9, 2020.
U.S. Office Action for U.S. Appl. No. 15/740,699; dated Oct. 28, 2020.
U.S. Office Action for U.S. Appl. No. 15/740,689 dated Jul. 9, 2020.
EP Office Action for Application No. 16 750 907.4; dated Nov. 6, 2018.
International Search Report for International Application No. PCT/FR2016/051637 dated Oct. 31, 2016 (2 pgs).
Notice of Allowance for U.S. Appl. No. 15/740,699I dated Mar. 10, 2021.

* cited by examiner

METHOD FOR CONTROLLING A HOME-AUTOMATION FACILITY

CROSS REFERENCE TO RELATED APPLICATIONS

This application is a National Stage of PCT Application No. PCT/FR2016/051632 filed on Jun. 30, 2016, which claims priority to French Patent Application No. 15/56296 filed on Jul. 3, 2015, the contents each of which are incorporated herein by reference thereto.

TECHNICAL FIELD

The present invention concerns a method for controlling a home automation installation.

BACKGROUND

A home automation installation of a building may comprise a plurality of home automation devices. It is known to proceed to the configuration, the control and/or supervision of said installation by using a central control unit that communicates with one or more home automation device(s).

The registration of the central control unit and the configuration of the installation require the interaction with the central control unit.

The registration operations may be complicated by the manual input of the serial number or the identifier, or due to the fact that these operations must be carried out without access to a wide area network allowing access to a remote management unit.

The present invention aims to solve all or part of the aforementioned drawbacks.

BRIEF SUMMARY

To this end, the present invention concerns a method for controlling a home automation installation comprising at least one central control unit; the method being executed by a user terminal and comprising the following steps:

i. Selecting a first local connection mode or a second connection mode via a wide area network ii. Establishing a connection between the user terminal and at least one target unit, said at least one target unit being a central control unit in case the first local connection mode has been selected, and a management unit in case the second connection mode via a wide area network is selected;

iii. Sending a discovery message in connection with an installation identifier to the at least one target unit;

iv. Receiving at least one topology description message from the target unit comprising a description of a group of devices attached to the identifier of the installation.

Thanks to the arrangements according to the invention, the controlling of the home automation installation can be carried out indifferently through a local connection or a connection via a wide area network.

Message means a piece of information notified or received in the form of a synchronous or asynchronous call, which can also correspond to a local or remote function call.

Installation means a set comprising a plurality of home automation devices and a plurality of control units disposed in a single building or over a plurality of locations, each home automation device being linked to an electronic control unit among the plurality of electronic control units, the plurality of electronic control units forming a group under the monitoring of a user. The electronic devices form groups of at least one home automation device attached to an electronic control unit.

The same device or the same control unit may belong to two different installations under the responsibility of two different users. By way of example, a home automation device corresponding to a heating system can be comprised in a first home automation installation comprising a set of devices comprised in a housing, under the monitoring of a user occupying the housing, and in a second home automation installation comprising a set of home automation devices corresponding to heating systems disposed in a plurality of housings under the monitoring of an administrator user of the heating equipment for the plurality of housings.

Home automation device means a home automation equipment and/or a sensor, or part of a home automation equipment or part of a sensor corresponding to a functional subset.

Central control unit of the home automation installation means an electronic unit comprising at least one processing unit for containing and executing at least one computer program, comprising at least one communication module intended to monitor and/or control at least one home automation device and at least one communication module with the management unit. The electronic unit can be independent or integrated into a home automation device. In the latter case, the communication module intended to monitor and/or control the device can be a communication module internal to the home automation device and/or a communication module intended to monitor and/or control other home automation devices. In some applications, a central control unit can communicate with the management unit through an intermediate management unit, for example from a third-party service provider, whose intermediate management unit provides a service interface or API.

According to one aspect of the invention, the management unit is a server remotely connected to the at least one home automation installation, via a wide area network.

According to one aspect of the invention, the management unit is a server remotely connected to the at least one home automation installation, via a wide area network. According to another aspect of the invention, the management unit is a central unit intended to be linked to one or more central control unit(s) over separate private or local area networks, or over the same local area network.

According to one aspect of the invention, the method further comprises the following step:

Presenting an interface to a user over the user terminal allowing to control or monitor home automation devices belonging to the group of devices attached to the identifier of the installation, According to one aspect of the invention, the first local connection mode has been selected, the at least one target unit being at least one central control unit, the step of sending a discovery message in connection with an installation identifier corresponds to sending a discovery message to at least one control unit corresponding to a central control unit identifier associated with an installation identifier;

and the step of receiving at least one topology description message corresponds to:

receiving a topology description message from the at least one central control unit comprising a description of a group of devices attached to the central control unit, and registering the group of devices in connection with the identifier of the installation in the group of devices attached to the identifier of the installation.

According to one aspect of the invention, the identifier of the installation of the home automation installation being associated with a group comprising at least the identifiers of a first central control unit and of a second central control unit.

Thanks to the arrangements according to the invention, it is possible to use several central control units within the same installation in order to extend the number of types of home automation devices or the number of home automation protocols that can be used in the same installation or to increase the total number of devices of the installation, while preserving an identification of the belonging of the different home automation devices at the same installation.

Thus, the interface presented to the user can thus add an abstraction layer to hide the actual attachment of the devices to the central control units. The interface thus represents the home automation equipment, such as shutters, awnings, HVAC or lighting systems, controllable in the installation as well as the present sensors.

These arrangements are obtained without communication between the central control units, but simply by the logical attachment made upon registration.

According to one aspect of the invention, the method comprises at least the following steps:
  A first step of sending a first discovery message to the first control unit corresponding to a first central control unit identifier associated with the installation identifier;
  A second step of sending a second discovery message to the second control unit corresponding to a second central control unit identifier associated with the installation identifier;
  A first step of receiving a first topology description message comprising a description of a first group of devices attached to the first central control unit; and
  A second step of receiving a second topology description message comprising a description of a second group of devices attached to the second central control unit.
  A first step of registering the first group of devices in connection with the identifier of the installation in the group of devices attached to the installation; and
  A second step of registering the second group of devices in connection with the identifier of the installation in the group of devices attached to the installation;
  the identifier of the home automation installation being associated with a group of devices grouping together the devices contained in at least the first group of devices attached to the first central control unit and at least the second group of devices attached to the second central control unit.

Thus, the devices are considered as attached to the same identifier of an installation, in a group that brings together all the devices of the installation attached indifferently to the first or to the second central control unit that can be communicated to a user or to a third-party application.

According to one aspect of the invention, the second connection mode by a wide area network has been selected, the at least one target unit being at least one management unit,
  the step of sending a discovery message in connection with an installation identifier corresponds to sending a discovery message to a management unit;
  and the step of receiving at least one topology description message corresponds to receiving at least one topology description message from the management unit comprising a description of a group of devices attached to the identifier of the installation.

According to one aspect of the invention, the identifier of the installation of the home automation installation is associated with a group comprising at least the identifiers of a first central control unit and of a second central control unit,
  and the identifier of the home automation installation is associated with a group of devices grouping together the devices contained in at least a first group of devices attached to the first central control unit and at least one second group of devices attached to the second central control unit.

According to one aspect of the invention, the method further comprises the following step:
  registering an attachment information of at least one home automation device to a central control unit;
  The storage of this information is provided for the routing of the messages toward the concerned central control unit in case of command by the terminal.

According to one aspect of the invention, the home automation devices are identified only by a device identifier comprising an identifier of the central control unit to which said device is attached.

According to one aspect of the invention, the method further comprises the following steps:
  Closing the connection between the user terminal and the at least one a target unit;
  Invalidating the registration of the device group attached to the installation.

The present invention also concerns a computer program product comprising code instructions arranged to implement the steps of a method as described above, when said program is executed by a processor of a user terminal.

The present invention also concerns a method for controlling a home automation installation comprising at least one central control unit; the method being executed by a management unit and comprising the following steps:
  i. Receiving a discovery message in connection with an installation identifier from at least one user terminal;
  ii. Sending a discovery message to at least one control unit corresponding to a central control unit identifier associated with the installation identifier;
  iii. Receiving at least one topology description message from the at least one central control unit comprising a description of a group of devices attached to the central control unit;
  iv. Registering the group of devices attached to the central control unit in a device group attached to the identifier of the installation;
  v. Sending at least one topology description message to the user terminal comprising the description of the group of devices attached to the identifier of the installation.

The different aspects defined above that are not incompatible may be combined.

BRIEF DESCRIPTION OF THE DRAWINGS

The invention will be better understood using the detailed description presented below with reference to the appended drawings wherein.

DETAILED DESCRIPTION

In the following detailed description of the figures defined above, the same elements or the elements fulfilling identical functions may keep the same references in order to simplify the understanding of the invention.

Figure 1:
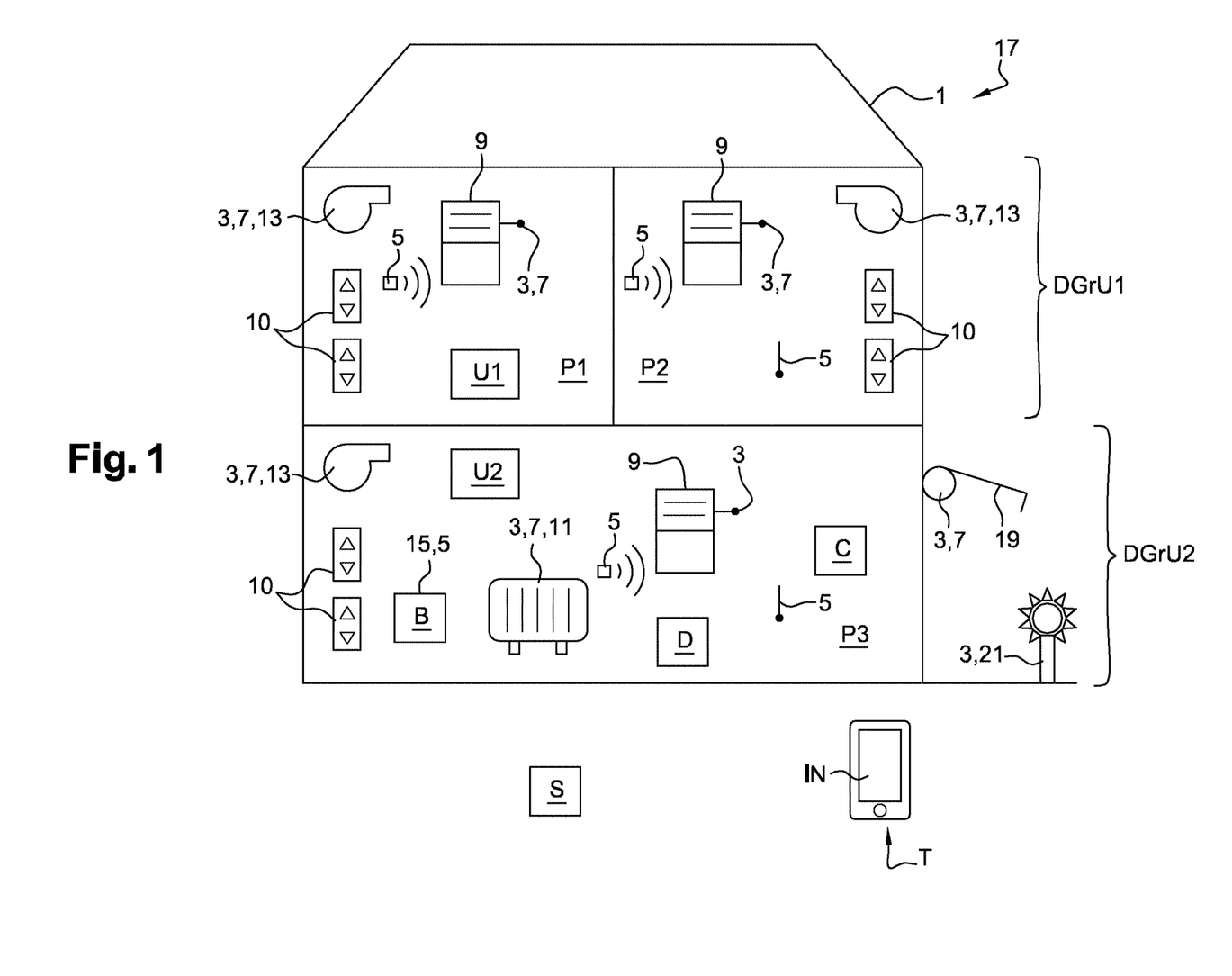
FIG. 1 is a schematic view of a building and of a home automation installation in accordance with an embodiment of the invention.

As illustrated in FIG. 1, a building 1 comprises as an example three rooms P1, P2, P3. The building 1 also comprises home automation equipment 3 and sensors 5.

A home automation equipment 3 may be an actuator arranged to move or adjust an element of the building 1, for example an actuator 7 for moving a roller shutter 9 or a terrace awning 19, or a regulation system 10 for a heater 11 or an aeraulic system 13. A home automation equipment 3 can also be a lighting, for example a terrace outdoor lighting 21 or a lighting control system, an alarm system, or a video camera, especially a video surveillance camera.

The home automation installation 17 may also comprise a control point 15 of an actuator 7, such as a wireless control box B for the roller shutter 9.

The home automation installation 17 may comprise one or more sensor(s) 5, integrally to an actuator 7, to a control point 15 or to the control box B, or independently from these elements. A sensor 5 can, in particular, be arranged to measure a physical quantity, for example a temperature sensor, a sunlight sensor or a humidity sensor. Home automation equipment 3 position sensors 5 of the building 1 such as, for example, sensors of the open state of a roller shutter 9 or position sensors of a door leaf such as a window, motorized or not, can also be provided. The home automation installation may also comprise one or more presence sensor(s).

A home automation equipment 3 and a sensor 5 are thus to be considered as units having available information on observed actual states of the building 1 elements and being able to share this information with other elements of the home automation installation 17.

The home automation equipment 3 and the sensors 5 can thus have access to any measurable physical quantity, such as the temperature of each room P1, P2, P3 or a state of an element of the building 1, such as the open state of a roller shutter 9, the status of an alarm, etc.

The designation of home automation device or device D will be thereafter used indifferently to designate sensors or home automation equipment, or parts of home automation equipment 3 or sensors 5.

The home automation installation 17 comprises one or more central control unit(s) U1, U2. Especially and as an example, two central control units U1, U2 are shown in FIG. 1.

Each central control unit U1, U2 is arranged to control and/or monitor part of the devices D of the installation 17 forming a group DGrU1, DGrU2. For example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the outdoor devices.

In particular, the control and/or the monitoring is carried out remotely, in particular by using a wireless communication protocol, for example a radio communication protocol. Each central control unit U1, U2 is arranged to group together all the data coming from the devices D of its group DGrU1, DGrU2 and to process these data.

The devices D that are part of a group DGrU1, DGrU2 belong to a local area network managed by a central control unit U1 or U2 within the home automation installation and communicate according to a local communication protocol with the central control unit U1 or U2. They have a local address in this network. The logic devices D can be modeled as end nodes or endpoints in the local area network.

The local addressing system may be hierarchical or flat, the address format can be numerical or alphanumerical.

Figure 2:
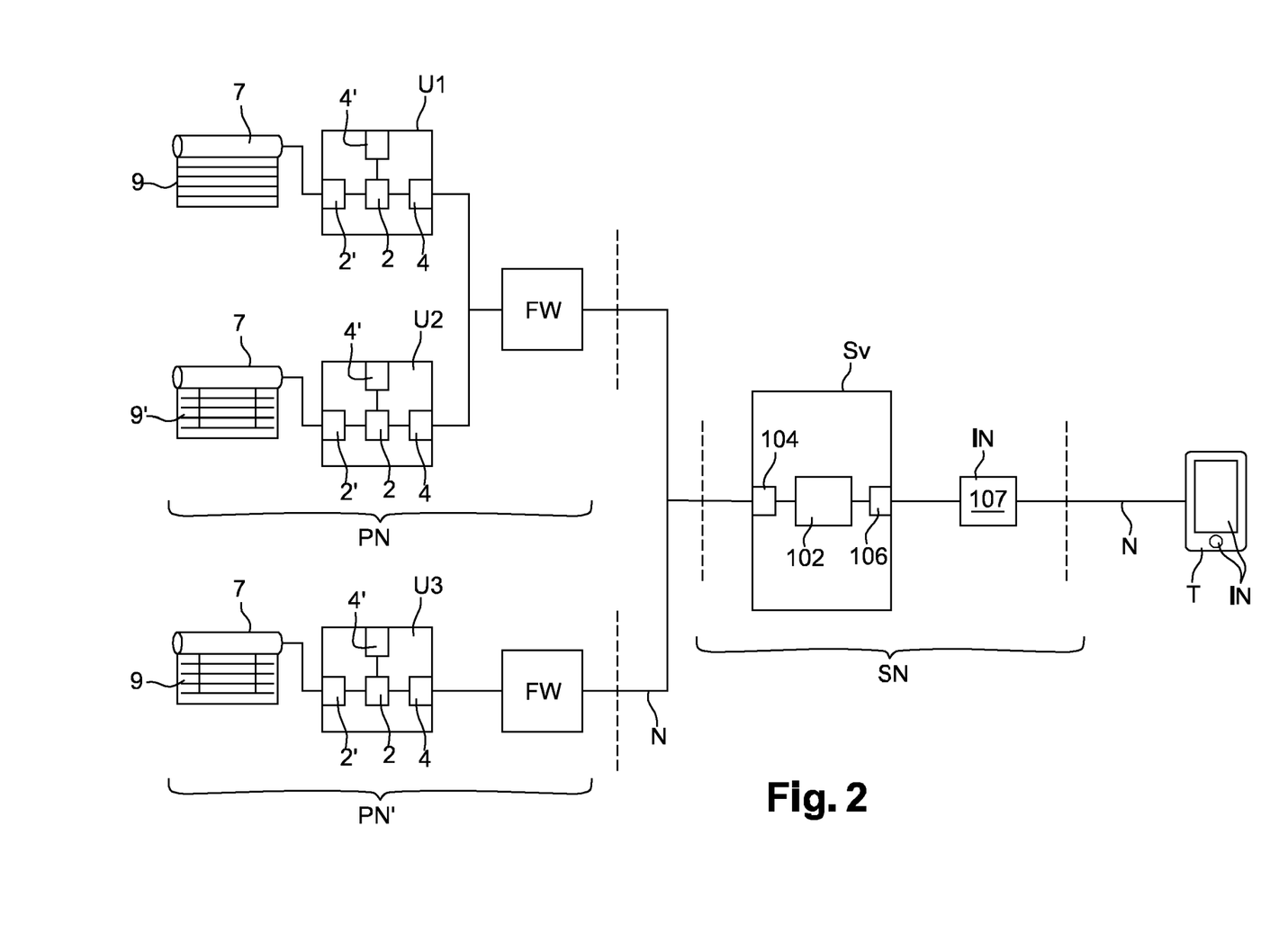
FIG. 2 is a diagram showing an architecture of a system comprising the home automation installation illustrated in FIG. 1 and a server intended to be connected to a user terminal.

As shown in FIG. 2, each central control unit U is arranged to communicate with a server Sv.

The central control units U1, U2, U3 are disposed on a private network PN, PN', whose access is generally protected by a firewall FW. Especially, in the example shown in FIG. 2, two central control units U1, U2 are disposed on a first private network corresponding to a first home automation installation, while a third central control unit U3 is disposed on a second private network PN', independent of the private network PN corresponding to a second home automation installation. The server Sv is also disposed on a private network SN. The private network PN is linked to a wide area network N, for example Internet. Of course, the server Sv is arranged to communicate with a set of such central control units U. One of these units will be described thereafter.

A central control unit U comprises a processing unit 2 arranged to contain and execute a first computer program. By way of example, the processing unit 2 comprises a processor, a storage flash memory as well as a random-access memory, and an Ethernet chip.

The central control unit U further comprises at least one communication module 2' intended to monitor and/or control home automation equipment 3 and/or sensors 5, the home automation equipment 3 may be actuators 7, lights 21, an alarm system, or a video camera.

By way of example, as shown in FIG. 2, the communication module 2' allows monitoring and controlling at least one actuator 7, a movable element of the building 1, such as for example a roller shutter 9, or an orientable sunshade 9' or other actuators 7 or lights 21, as previously described with reference to FIG. 1.

For example, the communication module 2' can be arranged to implement for example one or more of the protocols Z-Wave, EnOcean, IO Homecontrol, Somfy RTS, KNX, MODBUS, Wavenis, Philips HUE.

According to another possibility, for example under alarm systems, the central control unit can be integrated into the home automation device.

Receiving information from a sensor 5 providing a user with presence information or values of the surrounding parameters, such as temperature, humidity and brightness, is also provided. In the same way, the central unit U may allow monitoring and/or controlling an alarm system.

Each central control unit U further comprises a communication module 4 with the server Sv. The server Sv allows the remote control and/or monitoring and comprises one or more processing unit(s) 102 arranged to contain and execute a second computer program.

Each central control unit U further comprises a communication module 4' to communicate according to a local communication protocol, for example Bluetooth or Wifi, with a mobile communication terminal or a user terminal T. The mobile communication terminal T can contain and execute an application software APP.

In some applications, a central control unit U can communicate with the management unit via an intermediate server, for example a third-party service provider, whose intermediate server provides a service interface or API. The server Sv comprises, for its part, at least one communication interface 104 for the communication with the central unit U.

The server Sv can also comprise a communication interface 106 intended for the communication with a control and/or monitoring interface IN allowing a user to remotely monitor the home automation installation.

It should be noted that the word server is a logical designation that can cover the use of multiple physical servers to distribute the computer processing load to achieve.

The control and/or monitoring interface IN comprises, for example, a web server 107 and a mobile communication terminal T communicating via the wide area network N. the mobile communication terminal T may be, for example, a smartphone or a tablet. The mobile communication terminal T may be the same or a terminal of the same type as the one with which the central control unit U communicates locally by means of the communication module 4', or a different terminal. These mobile terminals will be designated indifferently by the reference T.

The control and/or monitoring interface IN comprises a processor that can be disposed at the web server 107 and/or the mobile communication terminal T.

The processor of the control and/or monitoring interface IN is arranged to use a third computer program. This third computer program is in turn arranged to execute a downloadable application.

The mobile communication terminal T comprises a data input device and a display device, for example in the form of a part of a touch control of a screen of the terminal T and in the form of one or more button(s) of the terminal T.

FIGS. 1 and 2 describe an installation 17 which comprises a set of devices D and a plurality of central control units U1, U2, disposed in the same housing, the same building or the same physical location.

According to another possibility, an installation 17 within the meaning of the invention can comprise home automation devices disposed over a plurality of locations, with at least one central control unit over each of these locations to which the home automation devices are attached, the central control units U of the installation being placed under the monitoring of a user.

By way of example, such an installation may comprise a set of home automation devices constituted of heating systems distributed in a set of housings or of tertiary premises, attached to a set of central control units U, the set of home automation devices being intended to be controlled by a specific user in charge of the heating for said set of housings or tertiary premises.

Figure 3:
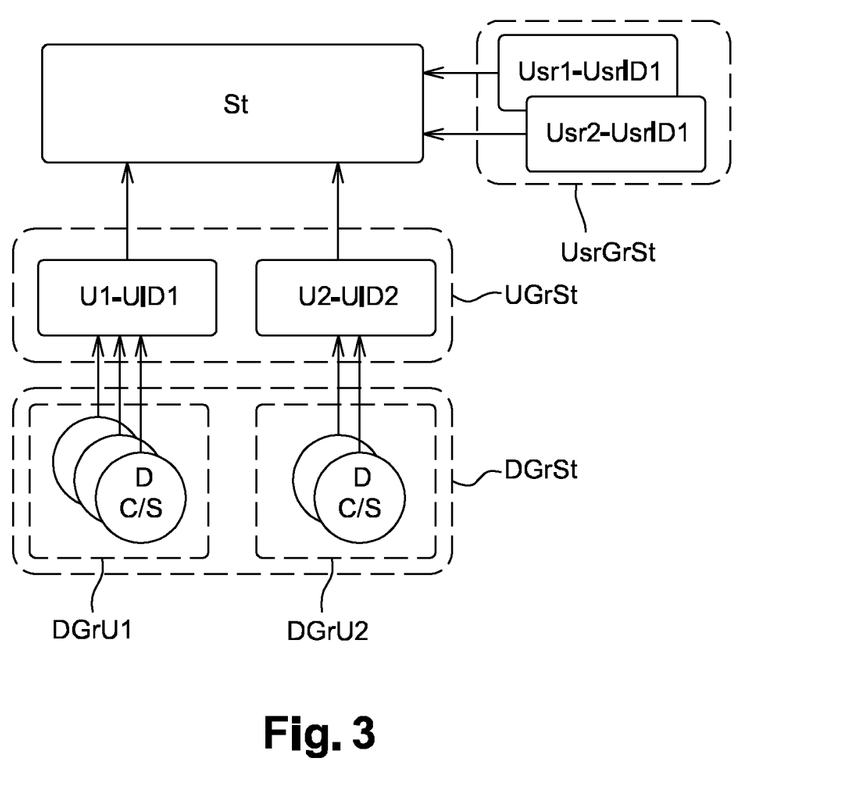
FIG. 3 is a diagram showing the relations between a representative entity of a home automation installation, the central control units and the devices of the home automation installation.

The representation of the installation 17 by a representative entity St on the server Sv will now be described with reference to FIG. 3, in the case where the installation comprises multiple central control units U.

The system according to the invention attaches several central control units U to a single object St representing an installation 17 by a configuration at the server Sv.

The server Sv can thus present to the user the installation 17 as a single set of devices D to the user, for example via an Application Programming Interface or API, in which each device D can accept a given set of commands C or present state variables S.

The server Sv can also use an abstraction system or layer for the commands C and the state variables S in order to provide a more generic API independent of the communication protocol used by a given device D.

The identification of the representative entity St of the installation can be according to an embodiment carried out by any one of the identifiers UID of one of the central control units U present in the installation, by an identifier of the installation or of the user.

Thus, to simplify the designation of an installation in the public APIs, it is sufficient that the users of these APIs provide a unique identifier attached to the representative entity St of the installation 17.

Internally to the server, a unique identifier of the representative entity St of the installation 17 may exist to facilitate the implementation.

Thus, the representative entity St can be associated with a list or group of devices DGrSt grouping together the devices contained in the different groups DGrU1, DGrU2 attached to each central control unit U1, U2, and to a group UGrSt of the identifiers UID of the concerned central control units U. The devices are identified by a unique identifier. A representative entity of a home automation installation can be associated with a given user Usr1, identified by an identifier UsrID, corresponding for example to a login and password combination or with a given user group UsrGrSt.

An exemplary embodiment of a unique identifier of a device DURL will now be described.

According to this embodiment, the unique identifier of a device DURL comprises information on:
The local native protocol of the home automation device ID,
The communication path toward the device D, including the intermediate central control units U and the termination addresses to cross, organized or not in a hierarchical topology;
A subsystem identifier subsystemId if the device comprises several functional subsets or subsystems that can be addressed separately. The devices that comprise only one functional set do not have an identification extension of a subsystem.

Thus, the form of the unique identifier of a device DURL may be as follows:
<Protocol>://<gatewayId>/<rawDeviceAddress>(#<subsystemId>)
In which the following fields are present:
protocol: identifier of the native device local protocol;
gatewayId: identifier of the first central control unit U, for example a serial number or a unique identifier.
rawDeviceAddress: a simple or multilevel path. Its meaning and its format depend on the addressing scheme of the local communication protocol of the device D.
subsystemId: this optional field indicates an identification, for example a rank of the subsystem (starting for example at 1), if such a subsystem is present.

EXAMPLES 1. knx://0201-0001-1234/1.1.3
This unique identifier of a device DURL corresponds to a device D communicating via the protocol KNX with an individual address 1.1.3 accessible by the central control unit U carrying the identifier #0201-0001-1234.

2. io://0201-0001-1234/145036#2

This unique identifier of a device DURL corresponds to a subsystem carrying the number 2 associated with a device D communicating via the protocol io homecontrol with a radio address 145036 accessible by the central control unit U carrying the identifier #0201-0001-1234.

The manipulations of the data relating to the devices D at the server Sv are made by an execution process or service ES. In order to store the data relating to the different device instances D mentioned above, the execution service can access to an instance database IDB. Of course, these different types of instances can also be stored separately. Moreover, database means here a storage mode suitable for a set of instances, which can be stored in a list, a tree or tables or any other appropriate data structure.

A method for controlling a home automation installation 17 of a building 1 will now be described with reference to FIG. 4, in a case of use of a local communication. It will be assumed here that the method is carried out by a mobile user terminal T, for example executing an application APP.

In a first step ECTLT1, a message MCtIS or a communication mode selection instruction is received for example from a user or a third-party application who/which transmits or communicates this message or this instruction respectively in a step ECTLUsr1 or ECTLA1. The user can have previously launched the application APP and created or opened his user account. He has entered his identifiers UsrID, for example a login and a password.

Figure 4:
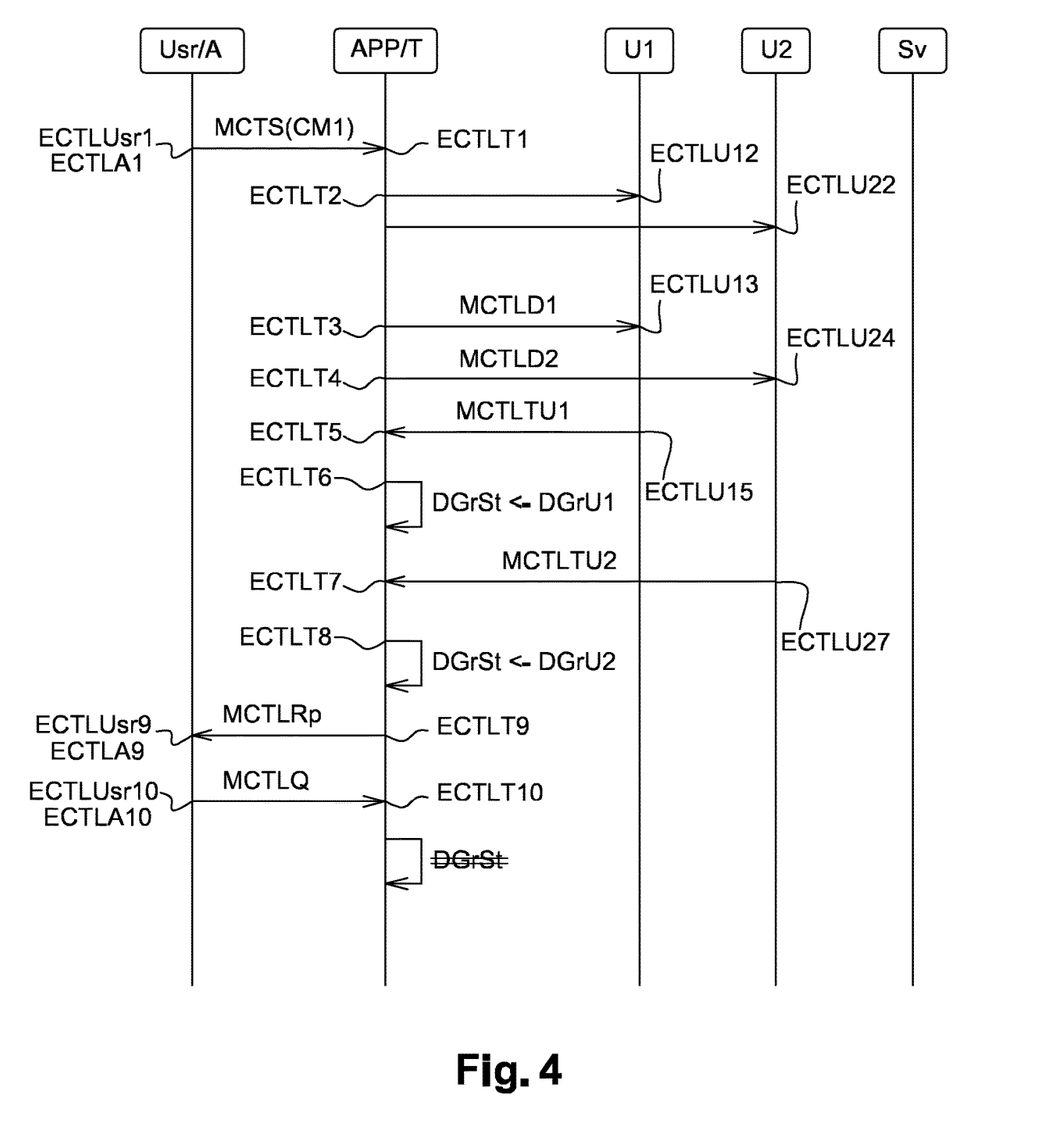
FIGS. 4 and 5 are diagrams illustrating two implementation modes of a method for controlling a central control unit of a home automation installation according to the invention.

It will be assumed in the case illustrated in FIG. 4 that the selected communication mode is a first local connection mode CM1;

According to one variant, the selection of the connection mode can be made automatically. The terminal T detects the proximity of the central control units U by using the discovery procedures specific to the local communication protocols such as Bluetooth or Wifi, and tries to establish a connection with said central control units U according to the local mode. If this connection is successfully established, then the selected connection mode is the local connection mode.

According to another variant, the selection of the connection mode can be made manually, via a man-machine interface of the terminal T. The application APP can offer the user the choice between the local connection mode or the connection mode via the wide area network.

A connection is then established in a step ECTLT2 locally individually between the terminal T and the central control units U of the installation 17, by using a local protocol, in particular a wireless protocol, such as for example a protocol of the type Bluetooth, Zigbee, or WiFi, either directly or via an access point that can integrate in this case a protocol gateway function (for example: Ethernet to WiFi/Bluetooth/Zigbee). The central control units U1 and U2 accept this connection respectively in steps ECTLU21 and ECTLU22. The terminal or the application APP executed on this terminal T will be thereafter designated indifferently by terminal.

It will be assumed that the identifier of the installation StID of the home automation installation 17 is associated with a group UGrSt comprising at least the identifiers UID1, UID2 of a first central control unit U1 and of a second central control unit U2. This association has been registered in the application of the terminal during a pre-registration phase.

The sending of a first discovery message MCTLD1 is made in a step ECtl3 to the first control unit U1 corresponding to the first central control unit identifier UID1 associated with the installation identifier StID.

The sending of a second discovery message MCTLD2 is made in a step ECTL4 to the second control unit U2 corresponding to the second central control unit identifier UID2 associated with the installation identifier StID.

Subsequently, the first central control unit U1 sends, in response to the discovery message MCTLD, in a step ECTLU15, a topology description message MCTLTU1 comprising a description of a group of devices DGrU1 attached to the central control unit U1, that the terminal receives in a step ECTLT7.

In a step ECTLT6, the group of devices DGrU1 is registered in connection with the identifier of the installation StID in a group of devices attached to the installation DGrSt.

The second central control unit U2 also sends, in response to the discovery message MCTLD, in a step ECTLU27, a topology description message MCTLTU2 comprising a description of a group of devices DGrU2 attached to the central control unit U2, that the terminal receives in a step ECTLT7.

For each device D, a central control unit U can also communicate commands and parameters associated with these devices. The commands can be deduced by the terminal from the device type or present by default in the application on the terminal T, the list of the devices used to validate the use of these commands, if a device of this type is present.

In a step ECTLT8, the group of devices DGrU2 is registered in connection with the identifier of the installation StID in a group of devices attached to the installation DGrSt.

The identifier StID of the home automation installation 17 is therefore associated with a group of devices DGrSt grouping together the devices contained in at least the first group of devices DGrU1 attached to the first central control unit U1 and at least the second group of devices DGrU2 attached to the second central control unit U2.

Thus, the devices are considered as attached to the same identifier of an installation, in a group that brings together all the devices of the installation attached indifferently to the first or to the second central control unit that can be communicated to a user or to a third-party application.

At this point, the discovery of the topology of the installation on the terminal can be considered complete.

Feedback to the user USr or to a third-party application A can be communicated in a step ECTLT9 in the form of a response message MCTLRp that receive it in a step ECTLUsr9 or ECTLA9 respectively. Alternatively, the step ECTLT9 may correspond to the presentation of an interface to a user Usr on the user terminal T allowing to control or monitor home automation devices D belonging to the group of devices DGrSt attached to the identifier of the installation StID, independently of their attachment to a central control unit U1 or U2.

Upon disconnection of the application, requested by the user in a step ELUsr10/ECTLA10 by a request or an output instruction MCTLQ, the terminal T proceeds, in a step ECTLT10, to the closing of the connection between the user terminal T and the central control units U1, U2, and to the invalidation of the registration of the device group attached to the installation DGrSt, the registration of the attachment of the at least one identifier UID of the at least one central control unit to the identifier of the installation StID being preserved.

A second implementation of the method will now be described with reference to FIG. 5, in case of use of a communication by a wide area network via a server Sv.

In a first step ECTLT1', a message MCTLS or a communication mode selection instruction is received by the terminal T for example from a user or a third-party application that transmits or communicates this message or this instruction respectively in a step ECTLUsr1' or ECTLA1'. The user may have previously launched the application APP and opened his user account. He has entered his identifiers UsrID, for example a login and a password.

Figure 5:
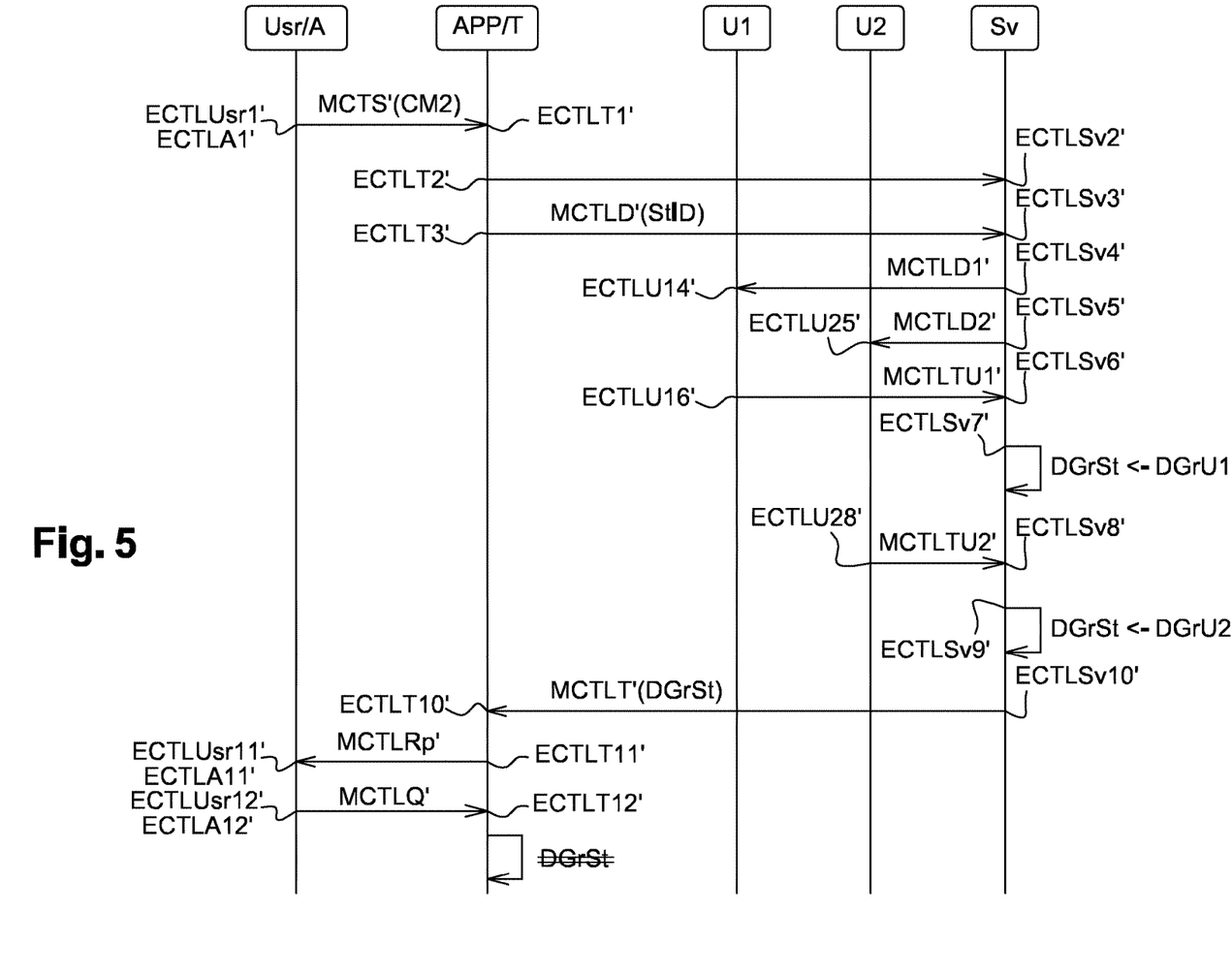

It will be assumed in the case illustrated in FIG. 5 that the selected communication mode is a second connection mode via a wide area network CM2;

According to one variant, the selection of the connection mode can be made automatically. The terminal T checks the presence near central control units U by using the discovery procedures specific to the local communication protocols such as Bluetooth or Wifi. If no central control unit U is detected nearby, then the terminal T seeks to connect via a wide area network, for example Internet, to a management unit Sv.

A connection is then established in a step ECTLT2' between the terminal T and the server Sv via an Internet type wide area network, the server accepting this connection in a step ECTLSv2'.

Then, a discovery message MCTLD' is sent in a step ECTLT3' in connection with an installation identifier StID to the server Sv, which receives this message in a step ECTLSv3'.

It will be assumed that the identifier of the installation StID of the home automation installation 17 is associated with a representative entity St of an installation itself associated with a group UGrSt comprising at least the identifiers UID1, UID2 of a first central control unit U1 and of a second central control unit U2. This association has been registered on the server during a pre-registration phase.

The server Sv then proceeds, in a step ECTLSv4', to the sending of a first discovery message MCTLD1' to the first control unit U1 associated with the representative entity St, then, in a step ECTLSv5', to the sending of a second discovery message MCTLD2' to the second control unit U2 associated with the representative entity St.

Subsequently, the first central control unit U1 sends, in response to the discovery message MCTLD1', in a step ECTLU16', a topology description message MCTLTU1' comprising a description of a group of devices DGrU1 attached to the central control unit U1, that the Server Sv receives in a step ECTLSv6'.

In a step ECTLSv7', the group of devices DGrU1 is registered or updated in connection with the group of devices DGrSt attached to the representative entity St of the installation.

The second central control unit U2 also sends, in response to the discovery message MCTLD2', in a step ECTLU28', a topology description message MCTLTU2' comprising a description of a group of devices DGrU2 attached to the central control unit U2, that the terminal receives in a step ECTLT8'.

For each device D, a central control unit U can also communicate commands and parameters associated with these devices. The commands can be deduced by the Server Sv from the type of device or present by default on the server Sv, the list of devices being used to validate the use of these commands, if a device of this type is present.

In a step ECTLSv9', the group of devices DGrU2 is registered or updated in connection with the group of devices DGrSt attached to the representative entity St of the installation.

The representative entity St of the home automation installation 17 is therefore associated with a group of devices DGrSt grouping together the devices contained in at least the first group of devices DGrU1 attached to the first central control unit U1 and at least the second group of devices DGrU2 attached to the second central control unit U2.

Thus, the devices are considered as attached to the same identifier of an installation, in a group that brings together all the devices of the installation attached indifferently to the first or to the second central control unit that can be communicated to a user or a third-party application.

At this point, the discovery of the topology of the installation on the Server Sv can be considered complete.

The server sends in a step ECTLSv10' a topology description message MCTLT' to the user terminal T comprising the description of the group of devices DGrSt attached to the identifier of the installation StID. This Message is received by the terminal in a step ECTLT10'.

A feedback to the user USr or to a third-party application A can be communicated in a step ECTLT11' in the form of a response message MCTLRp' that receive it in a step ECTLUsr11' or ECTLA11' respectively. Alternatively, the step ECTLT11' may correspond to the presentation of an interface to a user Usr on the user terminal T allowing the control or the monitoring of the home automation devices D belonging to the group of devices DGrSt attached to the identifier of the installation StID, independently of their attachment to a central control unit U1 or U2.

Upon disconnection of the application, requested by the user in a step ELUsrI2'/ECTLA12' by a request or an output instruction MCTLQ, the terminal T proceeds, in a step ECTLT12, to the closing of the connection between the user terminal T and the server Sv, and to the invalidation of the registration of the group of devices attached to the installation DGrSt, the registration of the identifier of the installation StID being preserved.

The invention claimed is:

1. A method for controlling a home automation installation comprising at least one central control unit; the method being executed by a user terminal and comprising the following steps:
   i. automatically checking, using a discovery procedure specific to local communication protocols, for the presence of at least one central control unit in a communication range of the user terminal;
   ii. automatically selecting a first local connection mode corresponding to a local area network if at least one central control unit is detected at step i, or of a second connection mode corresponding to a wide area network if no central control unit is detected at step i;
   iii. establishing a connection between the user terminal and at least one target unit, said at least one target unit being a central control unit in the case where the first local connection mode has been selected at step ii, and a management unit, remotely connected to the home automation installation in the case where the second connection mode has been selected at step ii;
   iv. sending a discovery message in connection with an identifier of the home automation installation to the at least one target unit; and
   v. receiving at least one topology description message from the target unit comprising a description of a group of devices attached to the identifier of the home automation installation.

2. The controlling method according to claim 1, further comprising the following step:
presenting an interface to a user on the user terminal allowing to control or monitor home automation devices belonging to the group of devices attached to the identifier of the home automation installation.

3. The controlling method according to claim 1, wherein when the first local connection mode has been selected, the at least one topology description message comprises a description of a group of devices attached to the central control unit and the method further comprises:
registering the group of devices in connection with the identifier of the home automation installation in the group of devices attached to the identifier of the home automation installation.

4. The controlling method according to claim 3, wherein the identifier of the home automation installation being associated with a group comprising at least identifiers of a first central control unit and of a second central control unit.

5. The controlling method according to claim 4, comprising at least the following steps:
a first step of sending a first discovery message to the first central control unit corresponding to a first central control unit identifier associated with the identifier of the home automation installation;
a second step of sending a second discovery message to the second central control unit corresponding to a second central control unit identifier associated with the identifier of the home automation installation;
a first step of receiving a first topology description message comprising a description of a first group of devices attached to the first central control unit; and
a second step of receiving a second topology description message comprising a description of a second group of devices attached to the second central control unit
a first step of registering the first group of devices in connection with the identifier of the home automation installation; and
a second step of registering the second group of devices in connection with the identifier of the home automation installation;
the identifier of the home automation installation being associated with a group of devices grouping together the devices contained in the first group of devices attached to the first central control unit and the second group of devices attached to the second central control unit.

6. The controlling method according to claim 1, wherein when the second connection mode has been selected,
the at least one topology description message comprises a description of a group of devices attached to the identifier of the home automation installation.

7. The controlling method according to claim 6, wherein the identifier of the home automation installation is associated with a group comprising at least identifiers of a first central control unit and of a second central control unit,
and wherein the identifier of the home automation installation is associated with a group of devices grouping together devices contained in a first group of devices attached to the first central control unit and a second group of devices attached to the second central control unit.

8. The controlling method according to claim 1, further comprising the following step:
registering an attachment information of at least one home automation device to the central control unit.

9. The controlling method according to claim 8, wherein the at least one home automation devices is identified only by a device identifier comprising an identifier of the central control unit to which the at least one home automation device is attached.

10. The controlling method according to claim 1, further comprising the following steps:
closing the connection between the user terminal and the at least one target unit; and
invalidating a registration of a group of devices attached to the home automation installation.

11. A computer program product comprising a non-transitory computer readable storage medium comprising code instructions arranged to implement the steps of a method according to claim 1 when the computer program product is executed by a processor of the user terminal.

12. A method for controlling a home automation installation comprising at least one central control unit, the method being executed by a management unit remotely connected to the home automation installation and comprising the following steps:
i. receiving a discovery message in connection with an identifier of the home automation installation from at least one user terminal having connected to the management unit as a consequence of the absence of any central control unit in a communication range of said user terminal, said absence having been determined by the application of a discovery procedure specific to local communication protocols;
ii. sending a discovery message to at least one central control unit corresponding to a central control unit identifier associated with the identifier of the home automation installation;
iii. receiving at least one topology description message from the at least one central control unit comprising a description of a group of devices attached to the at least one central control unit;
iv. registering the group of devices attached to the at least one central control unit in a group of devices attached to the identifier of the home automation installation; and
v. sending at least one topology description message to the at least one user terminal comprising a description of the group of devices attached to the identifier of the home automation installation.

13. The controlling method according to claim 2, wherein when the first local connection mode has been selected, the at least one topology description message comprising a description of a group of devices attached to the central control unit and the method further comprises:
registering the group of devices in connection with the identifier of the home automation installation in the group of devices attached to the identifier of the home automation installation.

14. The controlling method according to claim 13, wherein the identifier of the home automation installation being associated with a group comprising at least identifiers of a first central control unit and of a second central control unit.

15. The controlling method according to claim 14, comprising at least the following steps:
a first step of sending a first discovery message to the first central control unit corresponding to a first central control unit identifier associated with the identifier of the home automation installation;
a second step of sending a second discovery message to the second central control unit corresponding to a second central control unit identifier associated with the identifier of the home automation installation;

a first step of receiving a first topology description message comprising a description of a first group of devices attached to the first central control unit; and a second step of receiving a second topology description message comprising a description of a second group of devices attached to the second central control unit;

a first step of registering the first group of devices in connection with the identifier of the home automation installation; and a second step of registering the second group of devices in connection with the identifier of the home automation installation;

the identifier of the home automation installation being associated with a group of devices grouping together the devices contained in the first group of devices attached to the first central control unit and the second group of devices attached to the second central control unit.

16. The controlling method according to claim 2, wherein when the second connection mode has been selected, the at least one topology description message comprising a description of a group of devices attached to the identifier of the home automation installation.

17. The controlling method according to claim 16, wherein the identifier of the installation of the home automation installation is associated with a group comprising at least identifiers of a first central control unit and of a second central control unit, and wherein the identifier of the home automation installation is associated with a group of devices grouping together devices contained in a first group of devices attached to the first central control unit and a second group of devices attached to the second central control unit.

18. The controlling method according to claim 2, further comprising the following step:
registering an attachment information of at least one home automation device to the central control unit.

19. The controlling method according to claim 3, further comprising the following step:
registering an attachment information of at least one home automation device to the central control unit.

20. The controlling method according to claim 4, further comprising the following step:
registering an attachment information of at least one home automation device to the central control unit.

21. A method for controlling a home automation installation comprising at least one central control unit, the method being executed by a user terminal and comprising the following steps:
i. automatically checking, using a discovery procedure specific to local communication protocols, for the presence of at least one central control unit in a communication range of the user terminal;
ii. manually selecting, by a user of the user terminal, a first local connection mode corresponding to a local area network if at least one central control unit is detected at step i, or of a second connection mode corresponding to a wide area network if no central control unit is detected at step i;
iii. establishing a connection between the user terminal and at least one target unit, said at least one target unit being a central control unit in the case where the first local connection mode has been selected at step ii, and a management unit, remotely connected to the home automation installation in the case where the second connection mode has been selected at step ii;
iv. sending a discovery message in connection with an identifier of the home automation installation to the at least one target unit; and
v. receiving at least one topology description message from the target unit comprising a description of a group of devices attached to the identifier of the home automation installation.

* * * * *